(12) United States Patent
Maheshwari

(10) Patent No.: US 10,169,365 B2
(45) Date of Patent: Jan. 1, 2019

(54) MULTIPLE DEDUPLICATION DOMAINS IN NETWORK STORAGE SYSTEM

(71) Applicant: HEWLETT PACKARD ENTERPRISE DEVELOPMENT LP, Houston, TX (US)

(72) Inventor: Umesh Maheshwari, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 283 days.

(21) Appl. No.: 15/059,160

(22) Filed: Mar. 2, 2016

(65) Prior Publication Data

US 2017/0255643 A1    Sep. 7, 2017

(51) Int. Cl.
*G06F 17/30* (2006.01)

(52) U.S. Cl.
CPC .. *G06F 17/30156* (2013.01); *G06F 17/30194* (2013.01); *G06F 17/30312* (2013.01)

(58) Field of Classification Search
None
See application file for complete search history.

(56) References Cited

U.S. PATENT DOCUMENTS

| | | | |
|---|---|---|---|
| 5,530,850 A | | 6/1996 | Ford et al. |
| 8,458,144 B2* | | 6/2013 | Maydew ........... G06F 17/30156 707/692 |
| 8,683,153 B1* | | 3/2014 | Long ................ G06F 3/0608 711/112 |
| 8,977,812 B1* | | 3/2015 | Chen ................ G06F 3/0608 707/692 |
| 9,684,668 B1* | | 6/2017 | Guo ................ G06F 17/30156 |
| 2010/0042790 A1* | | 2/2010 | Mondal ............. G06F 3/0608 711/161 |
| 2012/0166401 A1* | | 6/2012 | Li .................. G06F 17/3033 707/692 |
| 2013/0097380 A1* | | 4/2013 | Colgrove ......... G06F 17/30159 711/118 |
| 2016/0021020 A1* | | 1/2016 | Deguchi ............ G06F 3/061 709/226 |

(Continued)

OTHER PUBLICATIONS

Active@ Data Recovery Software, "NTFS Journaling", NTFS Transaction Journal, Feb. 19, 2016, p. 1-6. <https://web.archive.org/web/20160219215413/http://www.ntfs.com/transaction.htm>.

(Continued)

*Primary Examiner* — Richard L Bowen

(57) ABSTRACT

Methods, systems, and computer programs are presented for deduplicating data in a storage device. One method includes an operation for identifying multiple deduplication domains for a storage system. A fingerprint index is created for each deduplication domain, where each data block stored in the storage system is associated with one of the plurality of deduplication domains. The method also includes operations for receiving a first data block the storage system, and for identifying a first deduplication domain from the plurality at of deduplication domains corresponding to the first data block. The first data block is deduplicated within the first deduplication domain utilizing a first fingerprint index associated with the first deduplication domain.

20 Claims, 10 Drawing Sheets

(56) References Cited

U.S. PATENT DOCUMENTS

2017/0161329 A1* 6/2017 Chambliss ........ G06F 17/30489

OTHER PUBLICATIONS

Prabhakaran et al., "Analysis and Evolution of Journaling File Systems", 2005, USENIX Annual Technical Conference, p. 105-120. <https://www.usenix.org/legacy/event/usenix05/tech/general/full_papers/prabhakaran/prabhakaran.pdf>.

Sripati et al., "When is the data in the journal written to the disk?", Sep. 17, 2014, Superuser (web page), p. 1-3. <https://superuser.com/questions/329004/when-is-the-data-in-the-journal-written-to-the-disk>.

Wikipedia, "Journaling file system", Feb. 19, 2016, p. 1-4. <https://en.wikipedia.org/w/index.php?title=Journaling_file_system&oldid=705835589>.

* cited by examiner

MULTIPLE DEDUPLICATION DOMAINS IN NETWORK STORAGE SYSTEM

BACKGROUND

1. Field of the Disclosure

The present embodiments relates to methods, systems, and programs for deduplicating data in a storage device.

2. Description of the Related Art

Network storage, also referred to as network storage systems or storage systems, is computer data storage connected to a computer network providing data access to heterogeneous clients. Typically network storage systems process a large amount of Input/Output (IO) requests, and high availability, speed, and reliability are desirable characteristics of network storage.

Some storage systems keep data that may be repeated multiple times. For example, a storage system may provide backup for many desktop clients, and many of the clients may be running the same operating system, which causes the storage system to keep multiple copies of the same software.

Some storage systems analyze the stored data and aim at minimizing redundancy by keeping only one copy of data that has been stored multiple times, in a process that is often referred to us deduplication, deduplicating, or dedup for short. However, deduplicating data may be an expensive operation in terms of resource utilization, such as managing the fingerprints taken of each data block stored in the system.

It is in this context that embodiments arise.

SUMMARY

Methods, devices, systems, and computer programs are presented for deduplicating data in a storage device. It should be appreciated that the present embodiments can be implemented in numerous ways, such as a method, an apparatus, a system, a device, or a computer program on a computer readable medium. Several embodiments are described below.

A system of one or more computers can be configured to perform particular operations or actions by virtue of having software, firmware, hardware, or a combination of them installed on the system that in operation cause the system to perform the actions. One or more computer programs can be configured to perform particular operations by virtue of including instructions that, when executed by data processing apparatus, cause the apparatus to perform the actions.

One general aspect includes a method including identifying a plurality of deduplication domains for a storage system. The method also includes creating a fingerprint index for each deduplication domain, where each data block stored in the storage system is associated with one of the plurality of deduplication domains. The method also includes receiving a first data block at the storage system, and identifying a first deduplication domain from the plurality of deduplication domains corresponding to the first data block. The method also includes deduplicating the first data block within the first deduplication domain utilizing a first fingerprint index associated with the first deduplication domain.

Implementations may include one or more of the following features. The method as recited where deduplicating the first data block includes determining a first fingerprint for the first data block. The method may also include determining if the first fingerprint is in the first fingerprint index. The method may also include storing the first data block in permanent storage when the first fingerprint is not in the first fingerprint index. The method as recited where deduplicating the first data block further includes, when the first fingerprint is in the first fingerprint index, identifying a second data block associated with the first fingerprint in the first fingerprint index. The method may also include associating the first data block with the first fingerprint and the second data block, where the first data block is not added to the permanent storage. The method as recited where deduplicating the first data block further includes, when the first fingerprint is not in the first fingerprint index, adding a fingerprint mapping to a buffer kept in a random access memory (RAM), the fingerprint mapping including the first fingerprint and a location of the first data block in the permanent storage. The method as recited further including merging fingerprint mappings in RAM associated with the first deduplication domain with the fingerprint index to create a new fingerprint index. The method may also include freeing from RAM the fingerprint mappings in ram associated with the first deduplication domain. The method as recited where the fingerprint index includes fingerprints of data blocks stored in the storage system, each fingerprint being mapped to one of the data blocks stored in the storage system. The method as recited where each deduplication domain is defined to track duplicate data blocks within the deduplication domain to store one copy of the duplicate data blocks, where data blocks existing in more than one deduplication domain will have a separate copy stored in permanent storage for each of the deduplication domains where the data blocks exist. The method as recited where identifying a first deduplication domain includes determining a first volume of the storage system that includes the first data block. The method may also include determining the first deduplication domain as the deduplication domain associated with the first volume. The method as recited where identifying a plurality of deduplication domains for a storage system includes providing a user interface for receiving input from an administrator of the storage system, the input identifying one of the deduplication domains for each volume in the storage system. The method as recited where the data blocks for the plurality of deduplication domains are stored intermingled within a permanent storage of the storage system.

Another general aspect provides a storage system that includes permanent storage, a memory and the processor. The permanent storage is for storing data blocks, where each data block stored in the permanent storage is associated with one of a plurality of deduplication domains. The memory is for storing a fingerprint index for each deduplication domain. Further, the processor is configured to receive a first data block and identify a first deduplication domain from the plurality of deduplication domains corresponding to the first data block, where the processor deduplicates the first data block within the first deduplication domain utilizing a first fingerprint index associated with the first deduplication domain.

Another general aspect includes a non-transitory computer-readable storage medium storing a computer program, the non-transitory computer-readable storage medium including program instructions for identifying a plurality of deduplication domains for a storage system. The storage medium also includes program instructions for creating a fingerprint index for each deduplication domain, where each data block stored in the storage system is associated with one of the plurality of deduplication domains. The storage medium also includes program instructions for receiving a first data block at the storage system. The storage medium also includes program instructions for identifying a first deduplication domain from the plurality of deduplication domains corresponding to the first data block. The storage medium also includes program instructions for deduplicating the first data block within the first deduplication domain utilizing a first fingerprint index associated with the first deduplication domain.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe methods, devices, systems, and computer programs for deduplicating data in a storage device. Typically, deduplication in a storage array requires the management of a large fingerprint index. However, the fingerprints, due to their intrinsic property of being very different even for small differences between two blocks of data, require lot of resources for processing. For example, when merging new fingerprints into the fingerprint index, the whole fingerprint index needs to be rewritten. In order to simplify the management of deduplication, multiple deduplication domains are defined, where each deduplication domain maintains its own fingerprint index. Although, there may be a small loss in deduplication of data because a block may be repeated in several domains, the gains in efficiency compensate for this small loss. For example, different domains may be active at different times, and fingerprint operations can be performed on smaller fingerprint indices at different times of the day.

It will be apparent, that the present embodiments may be practiced without some or all of these specific details. In other instances, well-known process operations have not been described in detail in order not to unnecessarily obscure the present embodiments.

Figure 1:
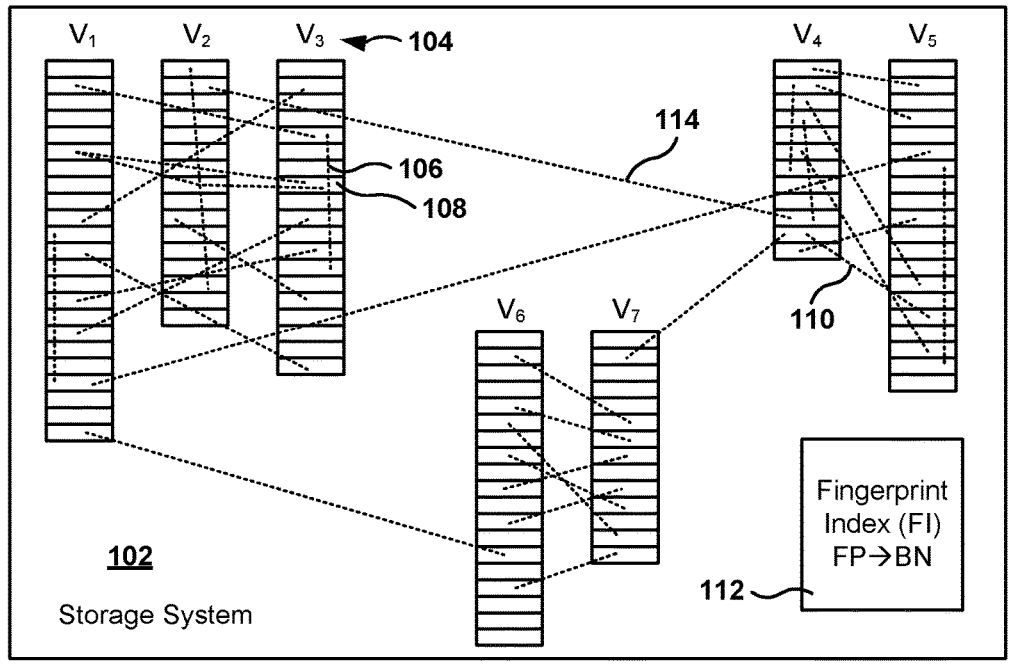
FIG. 1 illustrates the deduplication of data in a storage device, according to one embodiment.

FIG. 1 illustrates the deduplication of data in a storage device, according to one embodiment. In one embodiment, a storage system 102 stores data for one or more clients, and the data within the storage system 102 is organized in volumes (e.g., volume $V_3$ 104 ), also referred to as logical drives or LUNs (logical unit numbers), where each volume is a single accessible storage area (e.g., a file system for a virtual machine). The storage system 102 may be a stand-alone storage device or the storage system may include one or more physical devices that form a pool of devices that store the data for the plurality of volumes in the storage system 102.

Within each volume, the data is kept in blocks 108, where each block is the unit of space allocation in a volume, and in some embodiments, all blocks have the same size, but in other embodiments, blocks may have different sizes. Thus, a write operation to a volume will include one or more blocks. Some blocks within a volume may be duplicates of blocks in other volumes. The dotted lines in FIG. 1 (e.g., 106, 110, and 114) represent duplicates, where the blocks and the ends of a dotted line are duplicates of one another. The duplicated blocks may be within the same volume (e.g., blocks connected by line 106) or may be in different volumes (e.g., blocks connected by lines 114 and 110).

What is desired is to enable the sharing of storage for blocks in a storage system in order to avoid, or minimize, storing the same data multiple times. The process used to share storage space by different blocks is referred to as deduplication, or simply dedup.

Data deduplication, or simply called deduplication, is a data compression technique for eliminating duplicate copies of repeating data. Deduplication includes identifying which blocks in the storage system are duplicates of other blocks. Data deduplication inspects volumes of data and identifies sections—such as entire files or large sections of files—that are identical, and stores only one copy of the repeated data. For example, an email system may contain 100 instances of the same 1 MB file attachment. Each time the email platform is backed up, all 100 instances of the attachment are saved, requiring 100 MB of storage space. With perfect data deduplication, only one instance of the attachment is stored.

A snapshot is the presentation of a volume at a certain point in time. A clone is a writable volume that branches off another volume. The embodiments presented herein referred to volumes, but the same principles apply when working with snapshots and clones, which are particular kinds of volumes.

In one embodiment, all the volumes within storage system 102 are considered when finding duplicate blocks for deduplicating. This is referred to as having a single domain for deduplication. In this case, the maximum amount of deduplication is possible within the single domain because, ideally, only one copy of the same block has to be stored for all the blocks that are duplicate of that one block. In some embodiments, deduplication may be turned on or off per volume, i.e., some volumes may be deduplicated while other volumes are not. Further, deduplication may be turned on or off per domain, i.e., turning off deduplication in a domain means that all the volumes within the domain are not being deduplicated.

In one embodiment, the deduplication process utilizes fingerprinting. A fingerprinting algorithm is a procedure that maps an arbitrarily large data item (such as a computer file) to a much shorter bit string, referred to as the fingerprint. Fingerprints are typically used to avoid the comparison and transmission, or storage, of bulky data. For instance, a web browser or proxy server can efficiently check whether a remote file has been modified, by fetching only its fingerprint and comparing the fingerprint with that of the previously fetched copy. In one embodiment, fingerprint functions operate as high-performance hash functions used to uniquely identify substantial blocks of data.

In the exemplary embodiment of FIG. 1, a fingerprint index (FI) 112 maps fingerprints (FP) to block numbers (BN), where each block in the storage system is assigned a unique BN for identification purposes. More details regarding the fingerprint index 112 are provided below with reference to FIG. 3.

Figure 2A:
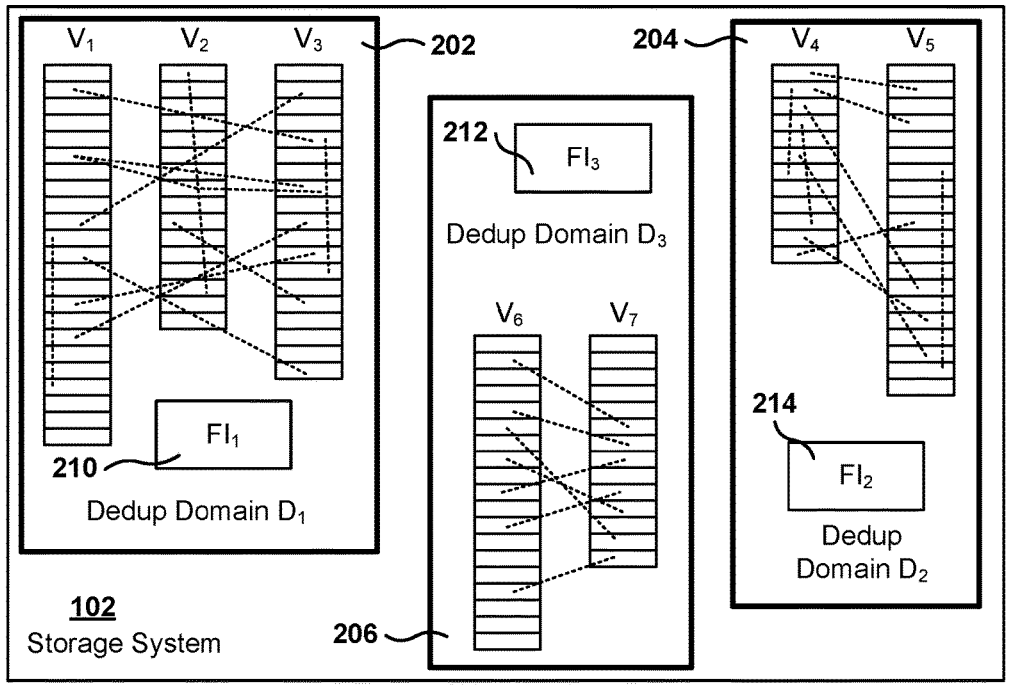
FIG. 2A illustrates the creation of deduplication domains in the storage device, according to one embodiment.

FIG. 2A illustrates the creation of deduplication domains in the storage device, according to one embodiment. In one embodiment, the storage system includes a plurality of deduplication domains, where each deduplication domains includes one or more volumes, such that the each deduplication domain deduplicates the data for the volumes within the domain. Consequently, duplicate blocks residing in different deduplication domains are not deduplicated, and there will be one copy for each duplicate block in each of the deduplication domains. In one embodiment, deduplication may be turned on or off by deduplication domain, such that some domains may be deduplicating data while other domains may be operating without deduplicating the data.

In the exemplary embodiment of FIG. 2A, three deduplication domains have been identified $D_1$ 202, $D_2$ 204, and $D_3$ 206, with dedup domain $D_1$ 202 including volumes $V_1$, $V_2$, and $V_3$; dedup domain $D_2$ 204 including volumes $V_4$ and $V_5$; and dedup domain $D_3$ 206 including volumes $V_6$ and $V_7$. In FIG. 2A, the dotted lines of FIG. 1 connecting duplicate blocks in different domains have been eliminated, signifying that there is no deduplication between blocks in different domains. Since deduplicating is independent from one domain to another, each deduplication domain includes its own fingerprint index: $FI_1$ 210 for $D_1$, $FI_2$ 214 for $D_2$, and $FI_3$ 212 for $D_3$.

In one embodiment, the deduplicating factor is the percentage of blocks being deduplicated, i.e., the amount of blocks that are not recorded in permanent storage in the storage device, instead being associated with a block that is recorded in permanent storage. For example, in a storage system with 10 identical blocks, the deduplicating factor would be 90%, since nine out of the 10 blocks are duplicates of a block that is kept in storage. In another embodiment, the deduplicating factor is the percentage of space (i.e., bytes) being deduplicated.

Ideally, the deduplication domains are defined such that there is a significant amount of deduplication within each domain, and no duplicates, or small amount of duplicates, between blocks in different domains. This way creating deduplication domain provides substantial benefits. For example, it is possible to report the benefits of deduplication at a more granular level by reporting deduplicating factors at the domain level instead of at the system level. Generally, the benefits of dedup are reported at a global level, but it is difficult to identify in what volumes, or for what type of data, the benefit is obtained. By using deduplication domains, it is possible to report deduplication gains at the domain level. For example, if a domain is defined for the email system, and another domain is defined for the sales database, it is possible to quickly identify which type of data is benefiting the most from deduplication. Additionally, by utilizing smaller domains, it is possible to operate with smaller fingerprint indices, which results in resource savings. More details are provided below regarding the benefits of a smaller FIs with reference to FIGS. 5A and 5B.

Ideally, a well-designed multi-domain deduplicating system will have a small amount of deduplication potential between different domains, and a high deduplication potential within the blocks in each domain. For example, if there is a low deduplication potential across two data sets, then it is desirable to break the two data sets into two different deduplication domains. Of course, a small downside is that a certain amount of deduplication is lost because there could be some duplicates across domains, but this loss will be a small if the deduplication potential is small across domains, when the domains are properly defined.

Figure 2B:
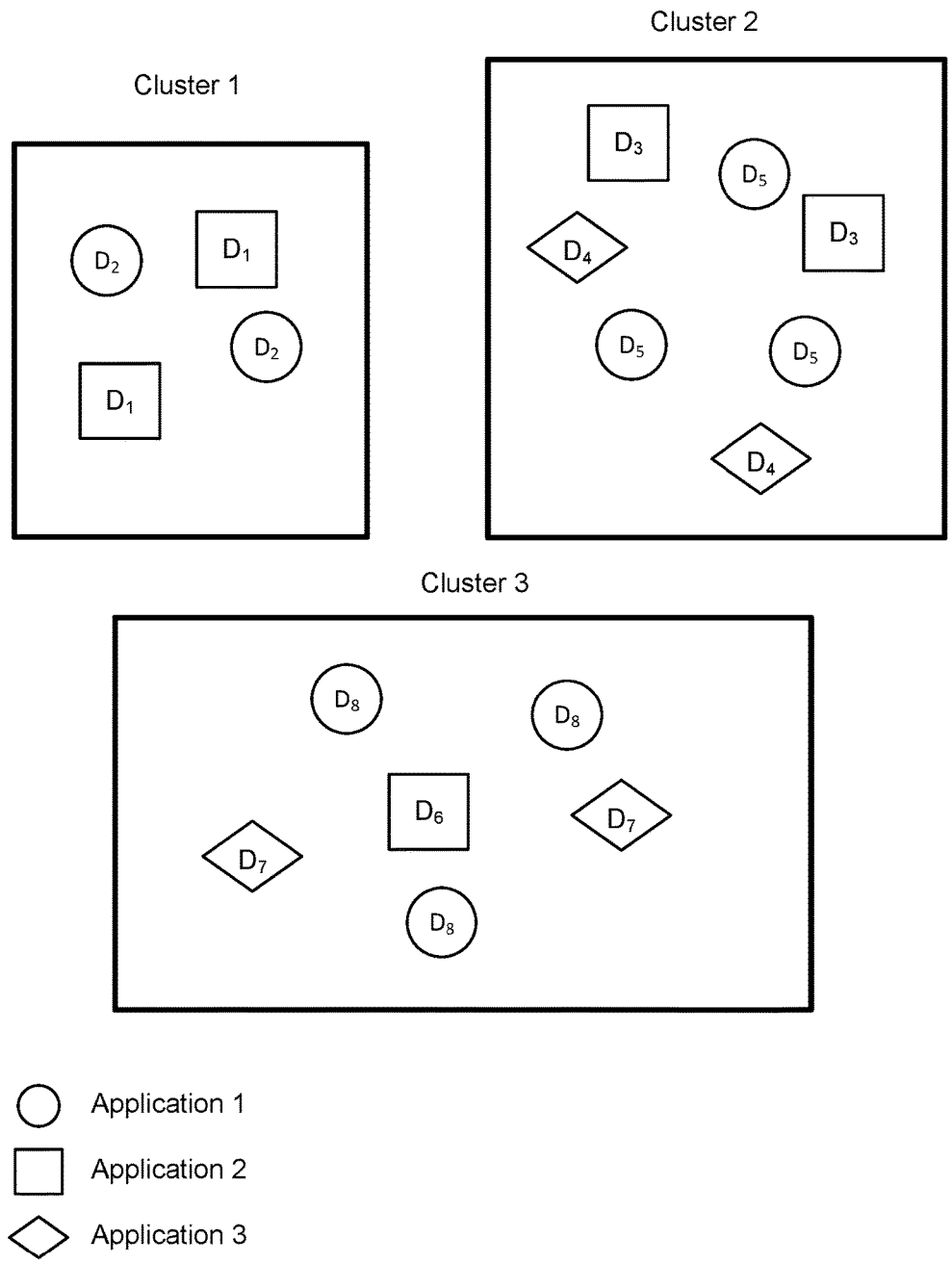
FIG. 2B illustrates the creation of deduplication domains, according to one embodiment.

FIG. 2B illustrates the creation of deduplication domains, according to one embodiment. In one embodiment, a plurality of factors are considered when determining deduplication domains, e.g., which volumes will be grouped into each deduplication domain.

The goal is to define deduplication domains such that there is little potential for deduplication across domains but there is high potential for deduplication within the same domain. In one embodiment, the deduplication factors include one or more of the following:

1. High potential for deduplication across the volumes in a domain;
2. Volume block size;
3. Application type;
4. Volume encryption key; and
5. User-defined groupings of volumes.

In one embodiment, the system estimates the potential for deduplication across different volumes, and then groups volumes that have high potential for deduplication within the same domain. For example, in FIG. 1 the system may determine that there is a natural grouping of volumes for deduplication, where volumes $V_1$-$V_3$ have a high potential for deduplication among themselves, but there is a low deduplication gain for having volumes $V_1$-$V_3$ in the same domain as volumes $V_6$ and $V_7$.

In one embodiment, the volumes in a deduplication domain have the same block size, but in other embodiments, deduplication domains may have volumes with different block sizes. In yet another embodiment, the volumes in a deduplication domain have block sizes that are multiples of a certain predefined size (e.g., 1 kB, but other values are also possible).

In one embodiment, volumes with the same block size are included in the same domain, because if deduplication is performed per block, the volumes must have the same block size to have deduplication. Therefore, block size is a straightforward way to group volumes for deduplication. In this case, there is no loss of potential deduplication across domains if the domains are associated with different block sizes.

Oftentimes, volumes associated with the same application are expected to deduplicate well together. For example, volumes used to store email data will deduplicate well together, or volumes used to store virtual machines programs will deduplicate well together as many of the virtual machines may utilize the same programs. Therefore, one of the factors for grouping volumes into a domain is the type of application associated with the volume.

In one embodiment, the encrypted volumes within a deduplication domain share the same encryption key. This means that all the volumes in a deduplication domain may be shredded together (e.g., permanently destroyed or erased) by discarding or eliminating the encryption key. Therefore, it is a natural grouping to have volumes in the same domain that share the same encryption key.

Additionally, users may be able to define groupings of volumes for deduplication domains. These groupings are referred to herein as clusters. This way, the administrator has the option to create deduplication domains for business units, or different customers, or different functional areas, or volumes that the administrator believes will deduplicate well, etc.

In one embodiment, the creation of deduplication domains is the intersection (e.g., Boolean AND operation) of two or more of the factors recited above. It is noted that not all factors may be considered every time. In the exemplary embodiment illustrated in FIG. 2B, two factors are considered: user-defined clusters and application type. In this case, the administrator has defined three clusters, where each cluster has a plurality of volumes. By applying the second factor for creating deduplication domains, the application type, the result is that volumes of the same application type within the same cluster are grouped together in deduplication domains.

There are three different types of applications, represented as circles, squares, or diamonds. The deduplication domains are then created within each cluster by grouping together the volumes associated with the same application type. Therefore, domain $D_1$ includes two volumes within cluster 1 of application 2 type; $D_2$ includes two volumes of cluster 1 of application 1; domain $D_3$ includes two volumes of application type 2 in cluster 2, etc.

Figure 3:
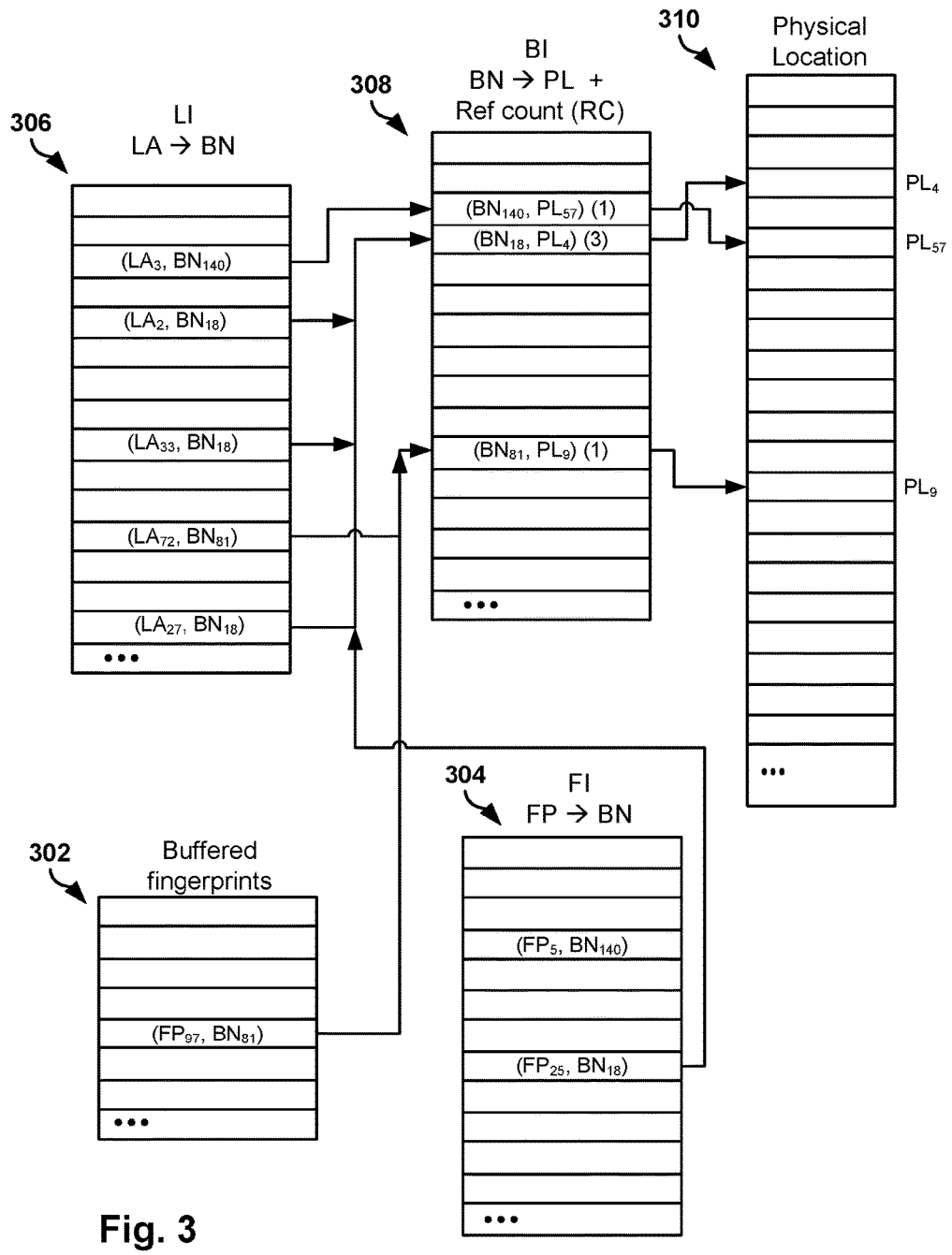
FIG. 3 illustrates the use of a fingerprint index for deduplication, according to one embodiment.

FIG. 3 illustrates the use of a fingerprint index for deduplication. In one embodiment, the storage system includes a logical address index (LI) 306 that maps logical addresses (LA) to block numbers BN, and a block index (BI) 308 that maps block numbers to physical locations 310, the physical locations referring to permanent storage. In addition, a fingerprint index (FI) 304 maps fingerprints (FP) to block numbers BN.

As used herein, mappings in an index, such as LI, that map one address to another are represented as a pair of values enclosed in parentheses and separated by a comma. For example, a mapping between a logical address $LA_j$ and a block number $BN_k$ is represented as $(LA_j, BN_k)$. This mean that within index LI, there is a pointer to block $BN_k$ for address $LA_j$. The mappings may be unidirectional, which mean that there is a pointer from one address to another, or the mappings may be bi-directional, which means that there can be pointers going in either direction, from one address to the other, or vice versa. Further, the index may be traversed by the first address of the pair, or by the second address of the pair, or by both addresses. For example, LI may be indexed by logical address to find out the physical location associated with a logical address, or vice versa.

In one embodiment, fingerprint index FI 304 is kept in permanent storage, and some fingerprint mappings may be kept in another memory (e.g., RAM) 302. These fingerprint mappings that have not been added to the FI are referred to herein as buffered fingerprints, because these fingerprint mappings are kept temporarily in memory until merged with (i.e., added to) the fingerprint index. The operation to merge buffered fingerprints into the fingerprint index is also referred to two as an update of the fingerprint index.

When an incoming write request, having a logical address (LA) $LA_j$ is received by the storage system, a block number $B_i$ is assigned to the block received. The write request for block $B_i$ includes a volume identifier $V_j$ and an offset $A_k$ within the volume. In one embodiment, the logical address refers to a volume and the block and/or offset within the volume.

In a system without deduplication, when an incoming block $B_i$ is received, block $B_i$ is stored in a physical location $PL_k$, and an entry is created in LI 306 for $(LA_j, B_i)$, and another entry is created in BI 308 for $(B_i, PL_k)$. Therefore, LI includes the mapping of the logical address to the block number, and BI includes the mapping of the block number to the physical location. As a result, the storage system identifies that a logical address is mapped to a physical location (e.g., $LA_3$ is mapped to $PL_{57}$ through $BN_{140}$).

For simplicity of description, embodiments presented herein are described with reference to operations performed on a single block, but the same principles may be applied for write operations that include multiple blocks. For example, an incoming write request may have a size of 5, 10, or 15 blocks, although other values are also possible.

When deduplication is turned on, in one embodiment, fingerprints are calculated as the data arrives at the storage system. FI is checked to see if the fingerprint is already in the index, and if the fingerprint already exists in the storage system, the block is not added to permanent storage. Instead, the incoming block is mapped to the already existing block with the same data.

In the exemplary embodiment of FIG. 3, a block of data having a logical address $LA_a$ is received and stored in RAM memory. Then the fingerprint $FP_f$ is calculated for the block of data, and the buffered fingerprints 302 and FI index 304 are checked to see if there is already an entry mapping $FP_f$ to a block in the system.

If there is no entry for $FP_f$ then the incoming block is assigned a block number $B_i$ and added to physical storage PL, and respective entries are added to the buffered fingerprints 302, LI, and BI indexes.

For example if a block of data with logical address $LA_{27}$ arrives, the fingerprint $FP_{25}$ is calculated. FI shows that $FP_{25}$ is already mapped to block $BN_{18}$, therefore, LI adds an entry $(LA_{27}, BN_{18})$ (or if the entry for $LA_{27}$ already exists then the entry is updated), and a reference counter in BI for $BN_{18}$ is incremented to reflect that one more block is now mapped to $BN_{18}$.

In another embodiment, deduplication may be performed by keeping the three different block entries in BI, but the different entries would all point to the same PL and the same fingerprint.

In the exemplary embodiment of FIG. 3, block $BN_{140}$ has no duplicates, therefore its entry in BI has a reference count of 1. On the other hand, block $BN_{18}$ is associated with three logical addresses $LA_2$, $LA_{33}$, and $LA_{27}$, all having the same data, and the reference counter of $BN_{18}$ is 3 to show that three different blocks are associated with the same physical location (and the same fingerprint $FP_{25}$).

In another embodiment, only two indices are used, LI and FI, and the data is referenced according to its fingerprint. However, fingerprints tend to be large numbers (e.g., SHA1 is 20 B long and SHA3-256 is 32 B). This increases the metadata overhead for the users of deduplication. On the other hand, the block number is smaller than the fingerprint, therefore using a block identifier reduces the amount of metadata required.

Further, when using fingerprints as the index to the data, it is not possible to turn off deduplication either temporarily or permanently for a volume. Further yet, there is no locality for the fingerprints, because the small differences in data result in very different fingerprints. This makes it difficult to preserve locality for the metadata.

Figure 4A:
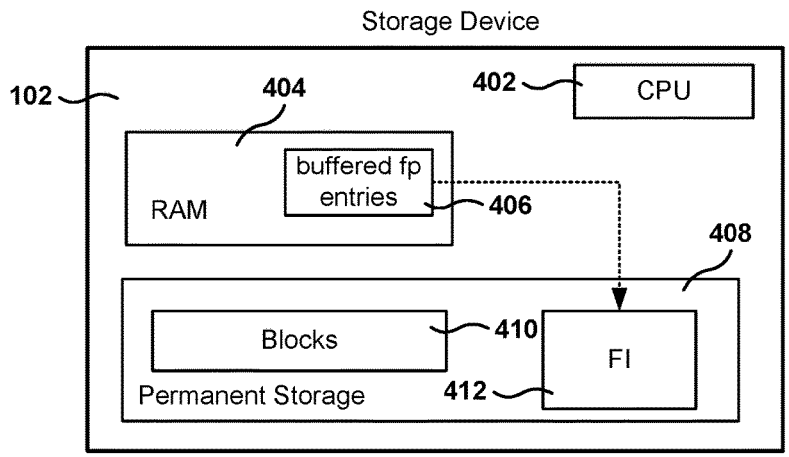
FIG. 4A is an exemplary architecture for implementing a deduplicating system, according to one embodiment.

FIG. 4A is an exemplary architecture for implementing a deduplicating system, according to one embodiment. In one embodiment, the network storage device 102, also referred to herein as a storage array, includes permanent storage 408 (such as Hard Disks Drives (HDD) and/or Solid State Drives (SSD), and/or NVRAM), as well as a processor 402 (e.g., within a controller for managing storage operations), and a random access memory (404).

In one embodiment, the buffered fingerprint entries are stored in the global fingerprint buffer 406 in RAM memory 404, and the FI index 412 is kept in permanent storage, such as in a HDD, or SDD, or NVRAM. When a certain condition is triggered, the buffered fingerprint entries in global fingerprint buffer 406 are merged with the FI 412.

Figure 4B:
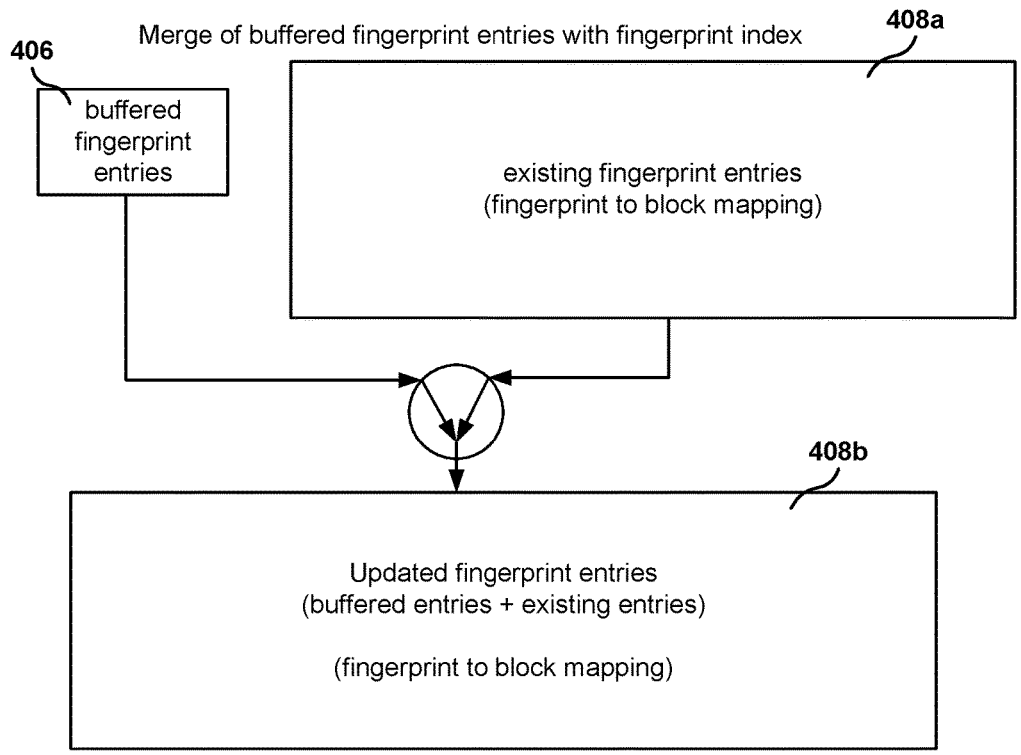
FIG. 4B illustrates the merging of buffered fingerprint entries with the fingerprint index, in accordance with one embodiment.

FIG. 4B illustrates the merging of buffered fingerprint entries with the fingerprint index, in accordance with one embodiment. As new fingerprint mappings are created, the new mappings are buffered in global fingerprint buffer 406. Eventually, the buffered fingerprint entries are merged into the existing fingerprints in the FI 408a to create a new, slightly bigger, updated FI 408b with the new fingerprints.

The fingerprints are generally cryptographic hashes of the data, with the property that blocks that are slightly different will result in very different fingerprints. This is a desirable property. But this means that there is no locality when writing contiguous blocks of data because their fingerprints may be scattered throughout the fingerprint space.

For example, if there are one million new fingerprints buffered, and there are one billion fingerprints in the FI, the new FI with the buffered entries will have 1.1 billion entries. However, the entries being merged will be randomly spread out throughout the FI, and not focused on just a small area of FI. This means that the complete FI needs to be rewritten (or a large percentage of the FI), and not just a small portion of the FI (e.g., 1,000,000 entries).

Therefore, to write a million entries into the FI, 1.1 billion entries have to be written. This phenomenon is referred to as write amplification. This is the reason why it is advantageous to buffer the FI entries before updating the FI, so multiple entries can be added at the same time, instead of one, or a few, at a time. In one embodiment, the amount of buffered entries depends on the amount of main memory available for buffering fingerprints.

Figure 5A:
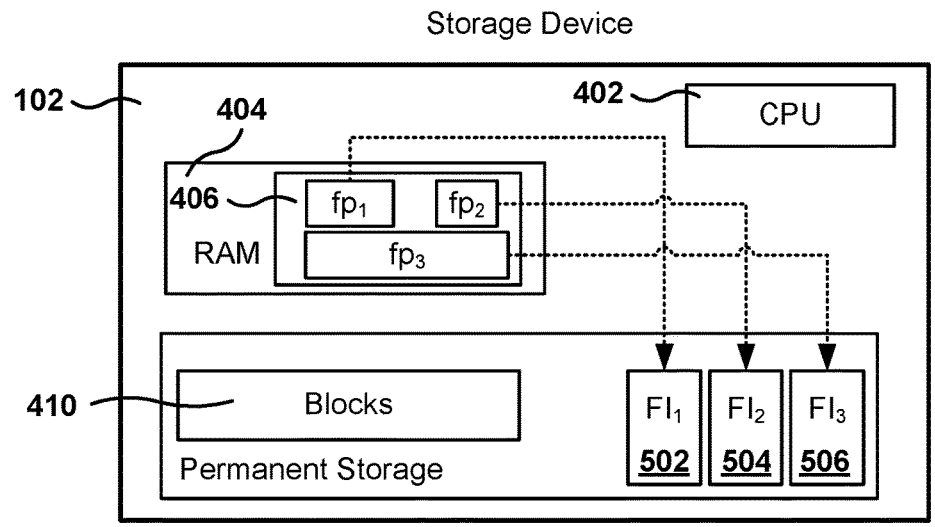
FIG. 5A illustrates an exemplary architecture of the storage device with multiple deduplication domains, according to one embodiment.

FIG. 5A illustrates an exemplary architecture of the storage device with multiple deduplication domains, according to one embodiment. In the storage device 102 of FIG. 5A, a plurality of deduplication domains have been defined. In this exemplary embodiment, there are three deduplication domains, $D_1$, $D_2$, and $D_3$, which have respective separate and independent fingerprint indexes, $FI_1$ 502, $FI_2$ 504, and $FI_3$ 506. Further, there are buffered fingerprints in global fingerprint buffer 406, and the buffered fingerprints for each domain are referred to as $fp_1$, $fp_2$, and $fp_3$.

In one embodiment, global fingerprint buffer 406 has a fixed size, but the buffered fingerprints areas (e.g., $fp_1$, $fp_2$, and $fp_3$) are not of fixed sixe. As buffered fingerprints are added, the different domains compete for storage in the global fingerprint buffer 406.

It is noted that although the fingerprint indexes are represented as having equal size, this is not necessarily true in the system, as the different deduplication domains may have different sizes and different fingerprint indices, depending on the amount of data and degree of deduplication for each of the domains. In addition, in one embodiment, the buffered fingerprints $fp_i$ are intermingled within the space reserved for fingerprints, so there are no space reservations for the buffered fingerprints for each of the domains. As a result, one active domain may have a larger amount of fingerprints buffered than a less active domain. In another embodiment, a reservation schema is identified for reserving space for each of the deduplication domains within the buffer space for fingerprints. In yet another embodiment, the different buffer fingerprints are kept in different separate areas of RAM 404.

It is noted that although the deduplication domains provide a logical separation of the volumes within the storage device, the data for all the volumes in the storage device is kept in the same permanent storage. Therefore, in one embodiment, the data from the different volumes from all the deduplication domains is intermingled within the permanent storage. This means that by creating deduplication domains, the storage device does not necessarily allocate different space in permanent storage for the different volumes, although it is possible to do so. This means that data from different deduplication domains may be in the same storage next to each other, within the same logical partition of data.

Having multiple domains allows a more granular reporting of the storage savings due to deduplication, because it is quick and easy to report deduplication gains for each of the domains. This is important in some cases where a deduplication domain is not being very efficient. For example assuming that $D_1$ has deduplication savings of 80%, $D_2$ savings of 65%, and D3 savings of 10%, the system administrator may decide that $D_3$ is not very efficient in deduplicating, and the overhead necessary for deduplicating (e.g., calculating and maintaining fingerprints) is not worth the savings in storage. Therefore, the system administrator may turn off deduplication for domain $D_3$.

Figure 5B:
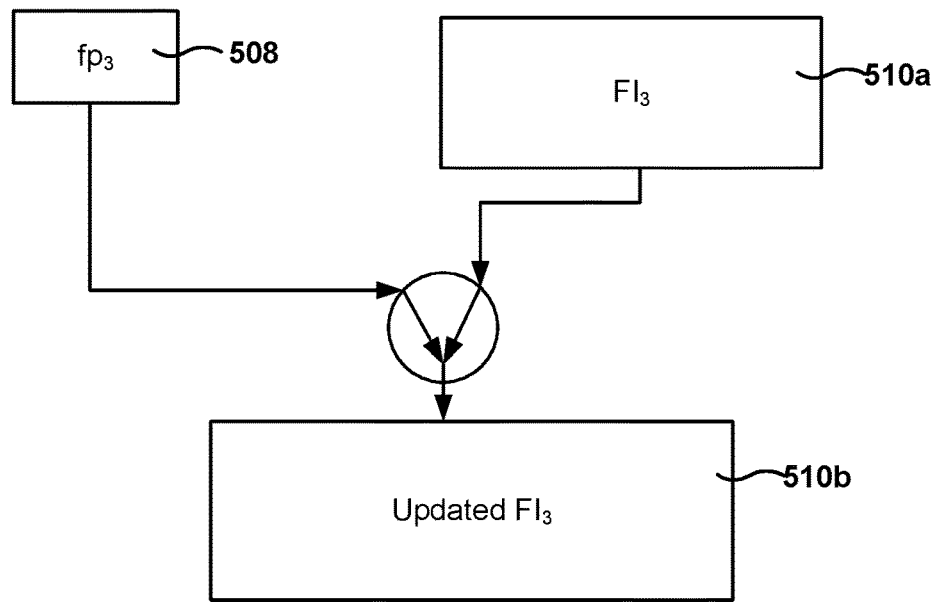
FIG. 5B illustrates the merging of buffered entries belonging to a fingerprint index of one of the deduplication domains, according to one embodiment.

FIG. 5B illustrates the merging of buffered entries belonging to a fingerprint index of one of the deduplication domains, according to one embodiment. FIG. 5B illustrates that by having multiple deduplication domains, it is possible to merge the buffer fingerprints for each domain separately from the other domains. This means that the merge operation will include a smaller set of buffered fingerprints and a smaller fingerprint index, because instead of having one monolithic deduplication domain, there are smaller, multiple deduplication domains. In turn, this will result in faster merge operations to merge the buffered fingerprints within the respective fingerprint index.

Having smaller deduplicating indices is more efficient because trying to find out if a fingerprint is already in the index is faster. The search for the fingerprint is performed on a smaller set, which is faster than having to do a search for all the fingerprints in the system.

In addition, if the deduplication domains are defined with efficiency in mind, it is possible to obtain resource utilization gains. For example, a domain that includes Microsoft Exchange data may be more active throughout the day, but another domain that processes batch data at night may not be active throughout the day. This means that during the day deduplication operations focus on the Microsoft Exchange domain instead of having to deal with a monolithic deduplication domain that includes all data. Thus, it is possible to perform deduplication utilizing a smaller fingerprint index.

For example, assuming a scenario where two domains have been defined, one for Microsoft Exchange and the other one for an SQL database, each of the domains having the same amount of entries in the fingerprint index (e.g., 5 billion). In an extreme case, all the updates (e.g., one million) during the day are for the Exchange domain. When the buffered fingerprint updates are merged with the Exchange fingerprint index, the operation requires merging into a fingerprint index with half the entries than if just one domain was in use. Therefore, write amplification has been reduced by 50% by using two domains instead of one. At night, the same would apply for the SQL domain because the SQL domain would be active and merge operations would be performed on the SQL domain.

The same principle may be applied to less extreme cases. In one embodiment, merge operations are performed when the buffered fingerprints reserve memory area is full or almost full. The domain with the most buffered fingerprints is selected for the merge, and after the merge, buffered fingerprints are then cleared from memory. It is not necessary need to perform the merge operation for all the domains at the same time, since there is space in the fingerprint buffer after one of the domains have been merged.

The system may continue operations until the buffer is again under resource utilization pressure. At this time, the operation is repeated, and the domain with the most buffered fingerprints is selected for a merge operation. It could be the same domain that was merged previously (e.g., when there is a domain that is very active compared to the other domains) or it could be a different domain.

For example, if there is a first domain occupying 90% of the fingerprint buffer, and a second domain occupying 10% of the fingerprint buffer, then the first domain is selected for a merge operation. However, the second domain is not merged yet since it would not be an efficient operation due to the small amount of fingerprints to the merged, which would cost an expensive write amplification operation.

This benefit would also be present when utilizing a large number of domains. For example if there were 100 domains but only 5% of the domains tend to be active at one time, then the savings would be substantial, because merge operations would be performed on a small domains with a much smaller fingerprint indices.

Figure 6A:
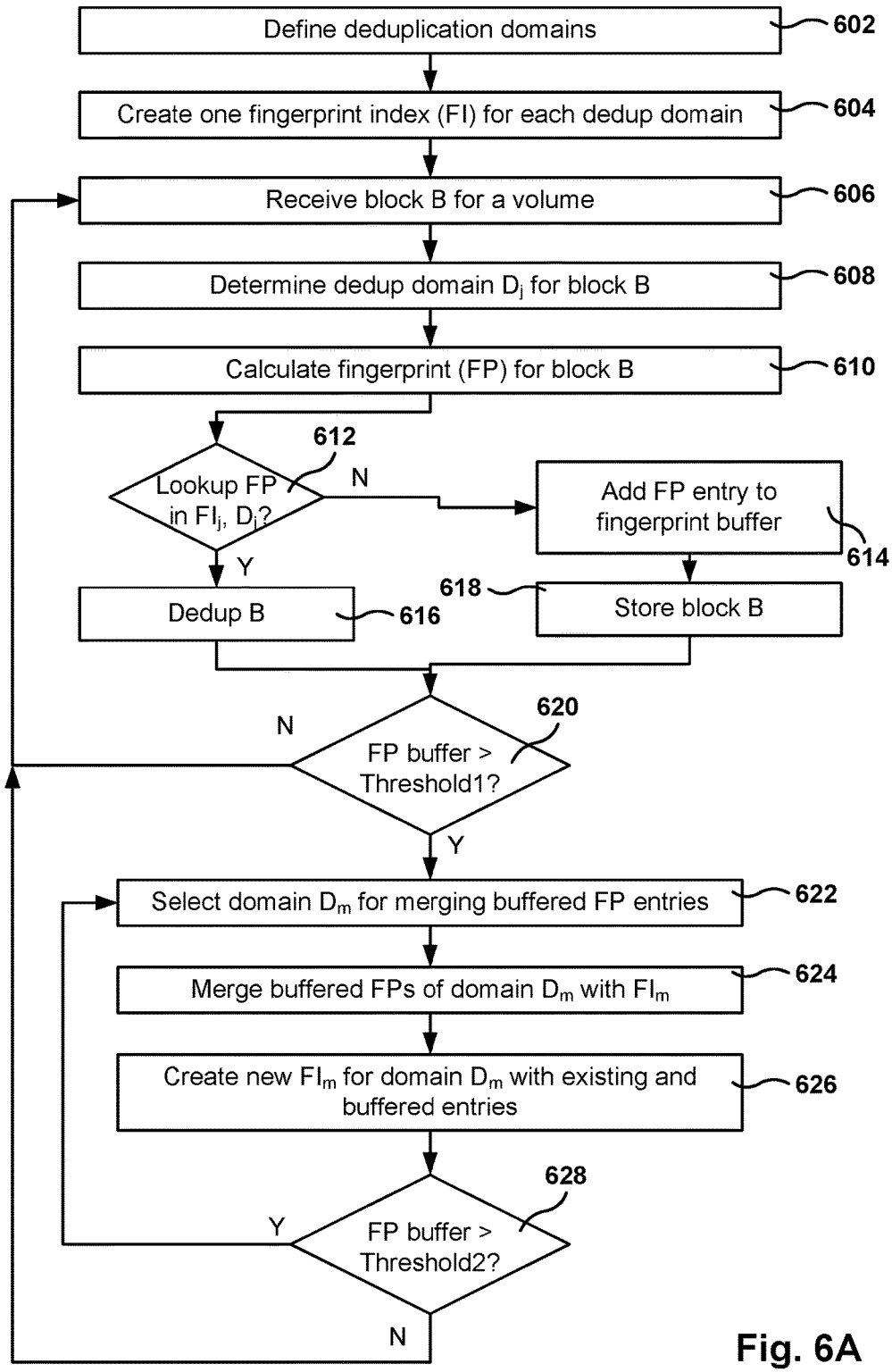
FIGS. 6A-6C are flowcharts for implementing aspects of the deduplicating system, according to one embodiment.
Figure 6B:
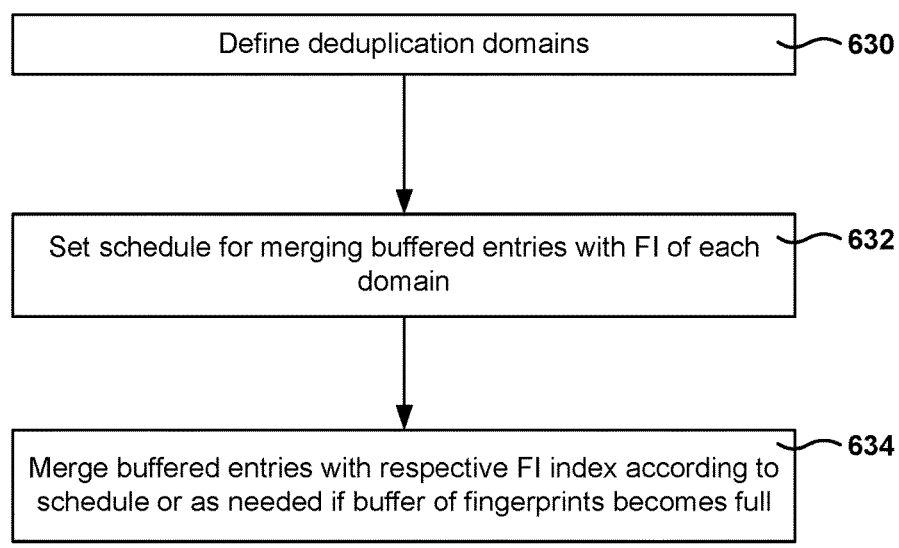
Figure 6C:
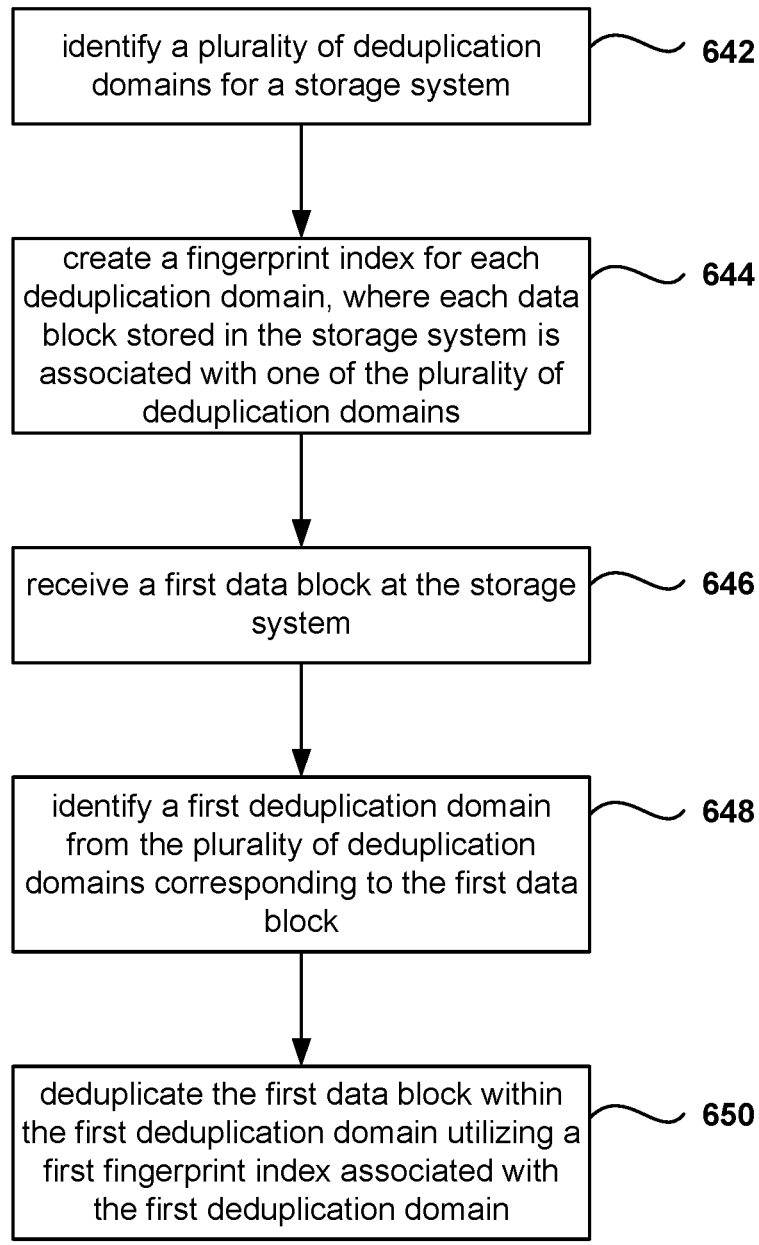

FIGS. 6A-6C are flowcharts for implementing aspects of the deduplicating system, according to one embodiment. While the various operations in these flowcharts are presented and described sequentially, one of ordinary skill will appreciate that some or all of the operations may be executed in a different order, be combined or omitted, or be executed in parallel.

FIG. 6A is a flowchart of the method for managing multiple deduplication domains. In operation 602, a plurality of deduplication domains are defined. From operation 602, the method flows to operation 604 where the fingerprint index (FI) is created for each of the deduplication domains.

In operation 606, a block B associated with a volume V is received. In operation 608, the method determines which of the deduplication domains $D_i$ is associated with the received block B.

From operation 608, the method flows to operation 610 for calculating the fingerprint (FP) of block B. In operation 612, a check is made to determine if fingerprint FP is in fingerprint index $FI_j$ corresponding to domain $D_j$. If the fingerprint FP is in $FI_j$ the method flows to operation 616, or if the fingerprint FP is not in index $FI_j$ the method flows to operation 614.

In operation 616, the received block B is deduplicated, which means that block B is not stored in permanent storage, and instead a mapping is created for block B that identifies the data for block B being stored in the same place as another existing block.

In operation 614, the fingerprint FP is added to the fingerprint buffer, and in operation 618 block B is stored in permanent storage (or cached until moved to permanent storage). After processing block B, in operation 620 a check is made to determine if the fingerprint buffer is full beyond a predetermined first threshold (e.g., 90%). If the fingerprint buffer is full beyond the first threshold, the method flows to operation 622, and if the fingerprint buffer is not full beyond the first threshold the method flows back to operation 606 to wait for the next incoming block to the storage system.

In operation 622, a domain $D_m$ is selected for a merge operation. In one embodiment, the domain $D_m$ selected is the domain that has the most entries in the fingerprint buffer, but other selection methods may be possible. For example, one or more of a plurality of criteria may be utilized from a group of selection criteria that includes the already mentioned number of buffered fingerprints, the amount of elapsed time since the last merge was performed, the degree of recent activity on the domain (e.g., to merge the domain that is currently active or very active), a priority weight assigned by the system administrator to each of the domains, time of day (e.g., certain domains are configured to be more readily merged during the day than during the night, a schedule set by the system or configured by a system administrator), etc.

In one embodiment, the domain selected for deduplication is the domain where the write amplification is lowest. In order to determine the domain with the lowest write amplification, a ratio is calculated as the size of the domain fingerprint buffer divided by the size of the domain fingerprint index ($fp_j/FI_j$). Then the domain with the maximum ratio $fp_j/FI_j$ is selected for updating the fingerprint index by merging the buffered entries. This means that the domain selected is the domain with the biggest number of entries buffered relative to the size of the fingerprint index.

The advantage of selecting the domain with the lowest write amplification is that different domains tend to be active at different times of the day. By selecting the domain with the lowest write amplification, the domains that are the most active are those selected for merging.

In operation 624, the buffered fingerprints of the selected domain $D_m$ are merged into the corresponding fingerprint index $FI_m$. In operation 626, a new updated fingerprint index $FI_m$ is created as a result of merging the old fingerprint index $FI_m$ with the new buffered fingerprints.

From operation 626, the method flows to operation 628 where a new check is made to determine if the fingerprint buffer is full beyond a predetermined second threshold (e.g., 80%). If the fingerprint buffer is full beyond the second threshold, the method flows to operation 622 to continue freeing fingerprint buffer space by merging the buffered entries of another domain. If the fingerprint buffer is not full beyond the second threshold, the method flows back to operation 606.

In one embodiment, the first threshold and the second threshold may be the same, but in other embodiments the thresholds may be different. The purpose of having a second threshold is that, once merging of buffered entries begins, the system creates additional space beyond the trigger threshold.

FIG. 6B is a flowchart for setting a schedule to merge buffered fingerprints into an existing fingerprint index. In one embodiment, is not necessary to wait until the buffer of fingerprints is full or almost full. Instead, the system may create a schedule to merge fingerprints when there is resource pressure or at certain times during the day, typically, when the system is not very active and resources are available for domain management operations.

In operation 630, deduplication domains are defined. In operation 632, a schedule is set for merging buffered fingerprint entries within the fingerprint indices of the respective domains. It is noted, that in addition of a schedule operations for merging fingerprints, fingerprint merges may also take place when the fingerprint buffer is full or close to full (e.g., 95% full).

From operation 632, the method flows to operation 634 where the buffered fingerprints are merged with the respective fingerprint index, according to the schedule or, in some cases as needed if the buffer of fingerprints becomes full.

FIG. 6C is a flowchart for managing deduplication in a storage system. Operation 642 is for identifying a plurality of deduplication domains for a storage system. From operation 642, the method flows to operation 644 where a fingerprint index is created for each deduplication domain, where each data block stored in the storage system is associated with one of the plurality of deduplication domains.

From operation 644 the method flows to operation 646 where a first data block is received at the storage system. In operation 648, the method identifies a first deduplication domain from the plurality of deduplication domains corresponding to the first data block. From operation 648, the method flows to operation 650 for deduplicating the first data block within the first deduplication domain utilizing a first fingerprint index associated with the first deduplication domain.

Figure 7A:
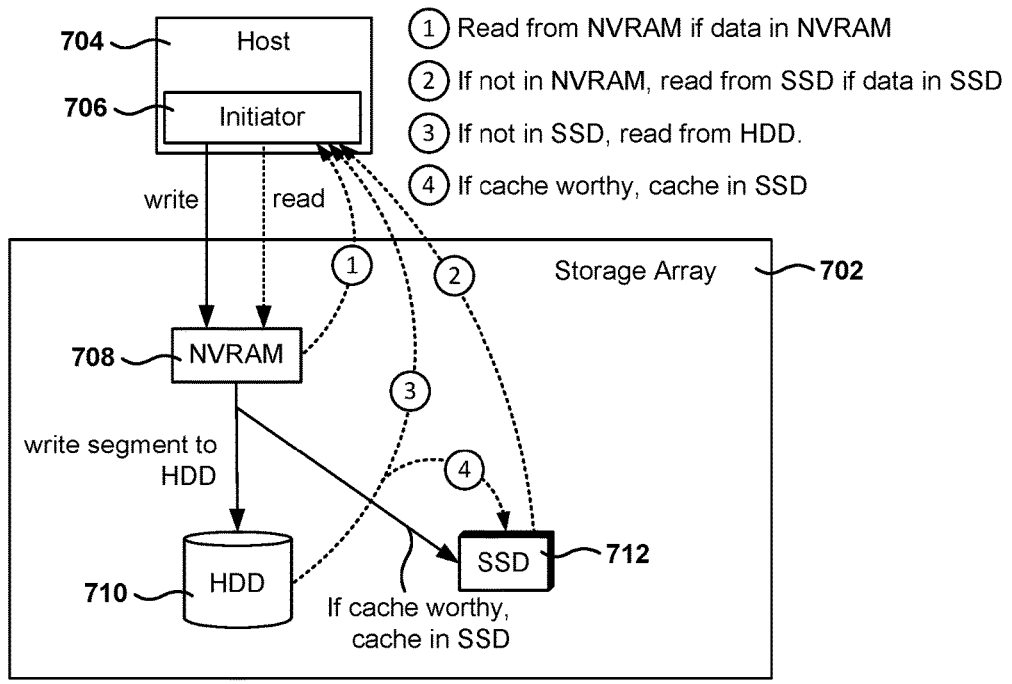
FIGS. 7A-7B illustrate the read and write paths within the storage array, according to several embodiments.
Figure 7B:
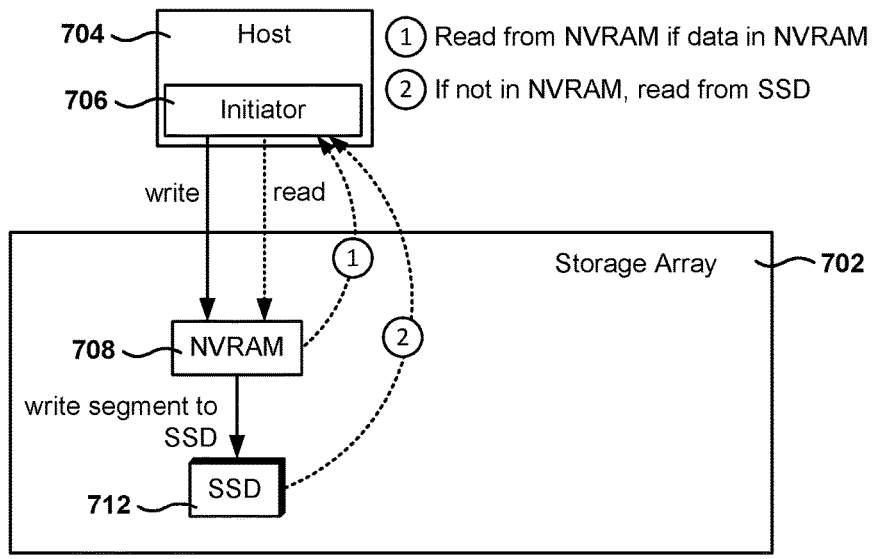

FIGS. 7A-7B illustrate the read and write paths within the storage array, according to several embodiments. FIG. 7A shows the write path for a hybrid system with SSDs and HDDs, where the initiator 106 in the host 104 sends the write request to the network storage device, also referred to herein as storage array 102. As the write data comes in, the write data is written into NVRAM 108, and an acknowledgment is sent back to the initiator (e.g., the host or application making the request). In one embodiment, storage array 102 supports variable block sizes. Data blocks in the NVRAM 108 are grouped together to form a segment that includes a plurality of data blocks, which may be of different sizes. The segment is compressed and then written to HDD 110. In addition, if the segment is considered to be cache-worthy (i.e., important enough to be cached or likely to be accessed again) the segment is also written to the solid state drive (SSD) cache 112. In one embodiment, the segment is written to the SSD 112 in parallel while writing the segment to HDD 110.

In one embodiment, the performance of the write path is driven by the flushing of NVRAM 108 to disk 110. With regards to the read path, the initiator 106 sends a read request to storage array 102. The requested data may be found in any of the different levels of storage mediums of the storage array 102. First, a check is made to see if the data is found in RAM (not shown), which is a shadow memory of NVRAM 108, and if the data is found in RAM then the data is read from RAM and sent back to the initiator 106. In one embodiment, the shadow RAM memory (e.g., DRAM) keeps a copy of the data in the NVRAM and the read operations are served from the shadow RAM memory. When data is written to the NVRAM, the data is also written to the shadow RAM so the read operations can be served from the shadow RAM leaving the NVRAM free for processing write operations.

If the data is not found in the shadow RAM then a check is made to determine if the data is in cache, and if so (i.e., cache hit), the data is read from the flash cache 112 and sent to the initiator 106. If the data is not found in the NVRAM 108 nor in the flash cache 112, then the data is read from the hard drives 110 and sent to the initiator 106. In addition, if the data being served from hard disk 110 is cache worthy, then the data is also cached in the SSD cache 112.

FIG. 7B illustrates the read and write paths for an all-flash array having SSDs for permanent storage and no HDDs. The write path includes writing the incoming data to NVRAM 108 and later saving the data in SSD 112. The read path is also simplified as compared to the hybrid system of FIG. 7A, where the data is read from NVRAM 108 if available in NVRAM, and if the data is not found in NVRAM 108 then the data is read from SSD 112.

Figure 8:
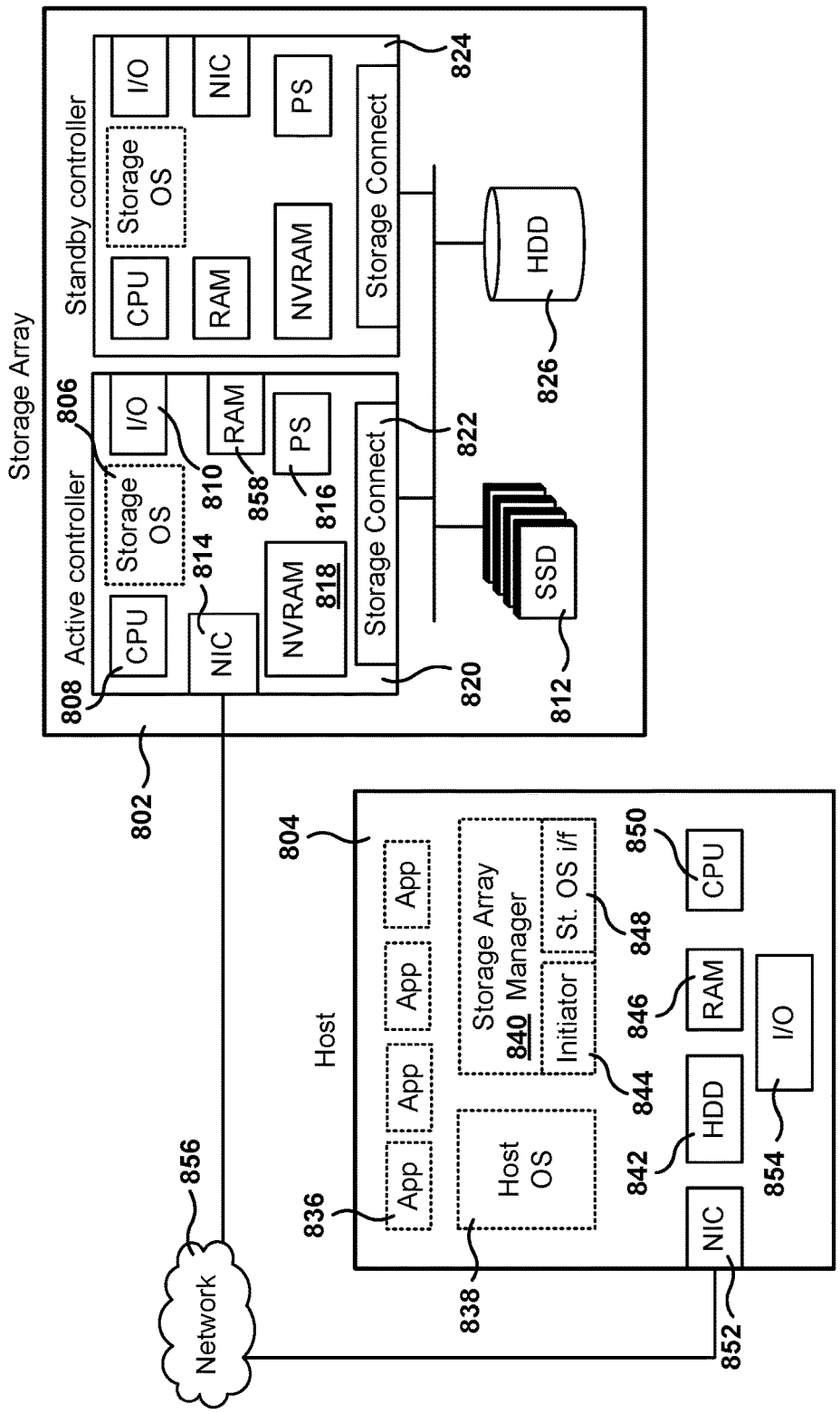
FIG. 8 illustrates the architecture of an all-flash storage array, according to one embodiment.

FIG. 8 illustrates the architecture of an all-flash storage array, according to one embodiment. In one embodiment, the storage array 802 includes an active controller 820, a standby controller 824, one or more SSDs 112, and disk storage 110. In one embodiment, the controller 820 includes non-volatile RAM (NVRAM) 818, which is for storing the incoming data as the data arrives to the storage array. After the data is processed (e.g., compressed and organized in segments (e.g., coalesced)), the data is transferred from the NVRAM 818 to HDD 110 and optionally to SSD 112.

In addition, the active controller 820 further includes CPU 808, general-purpose RAM 858 (e.g., used by the programs executing in CPU 808), input/output module 810 for communicating with external devices (e.g., USB port, terminal port, connectors, plugs, links, etc.), one or more network interface cards (NICs) 814 for exchanging data packages through network 856, one or more power supplies 816, a temperature sensor (not shown), and a storage connect module 822 for sending and receiving data to and from SSD 112. In one embodiment, standby controller 824 includes the same components as active controller 820.

Active controller 820 is configured to execute one or more computer programs stored in RAM 858. One of the computer programs is the storage operating system (OS) used to perform operating system functions for the active controller device. In some implementations, one or more expansion shelves may be coupled to storage array 802 to increase storage capacity.

Active controller 820 and standby controller 824 have their own NVRAMs, but they share SSDs 112. The standby controller 824 receives copies of what gets stored in the NVRAM 818 of the active controller 820 and stores the copies in its own NVRAM. If the active controller 820 fails, standby controller 824 takes over the management of the storage array 802. When servers, also referred to herein as hosts, connect to the storage array 802, read/write requests (e.g., IO requests) are sent over network 856, and the storage array 802 stores the sent data or sends back the requested data to host 804.

Host 804 is a computing device including a CPU 850, memory (RAM) 846, permanent storage (HDD) 842, a NIC card 852, and an IO module 854. The host 804 includes one or more applications 836 executing on CPU 850, a host operating system 838, and a computer program storage array manager 840 that provides an interface for accessing storage array 802 to applications 836. Storage array manager 840 includes an initiator 844 and a storage OS interface program 848. When an IO operation is requested by one of the applications 836, the initiator 844 establishes a connection with storage array 802 in one of the supported formats (e.g., iSCSI, Fibre Channel, or any other protocol). The storage OS interface 848 provides console capabilities for managing the storage array 802 by communicating with the active controller 820 and the storage OS 806 executing therein.

To process the IO requests, resources from the storage array 802 are required. Some of these resources may be a bottleneck in the processing of storage requests because the resources are over utilized, or are slow, or for any other reason. In general, the CPU and the hard drives of the storage array 802 can become over utilized and become performance bottlenecks. For example, the CPU may become very busy because the CPU is utilized for processing storage IO requests while also performing background tasks, such as garbage collection, snapshots, replication, alert reporting, etc. In one example, if there are many cache hits (i.e., the SSD contains the requested data during IO requests), the SSD cache, which is a fast responding system, may press the CPU for cycles, thus causing potential bottlenecks for other requested IOs or for processing background operations.

For purposes of discussion and understanding, reference is made to CASL as being an algorithm processed by the storage OS. However, it should be understood that optimizations, modifications, additions, and subtractions to versions of CASL may take place from time to time. As such, reference to CASL should be understood to represent exemplary functionality, and the functionality may change from time to time, and may be modified to include or exclude features referenced herein or incorporated by reference herein. Still further, it should be understood that the embodiments described herein are just examples, and many more examples and/or implementations may be defined by combining elements and/or omitting elements described with reference to the claimed features.

In one embodiment, it should be understood that the "block level processing" of SSDs 112 is different than "instruction level processing," which is a common function in microprocessor environments. In one example, microprocessor environments utilize main memory, and various levels of cache memory (e.g., L1, L2, etc.). Instruction level caching, is differentiated further, because instruction level caching is block-agnostic, meaning that instruction level caching is not aware of what type of application is producing or requesting the data processed by the microprocessor. Generally speaking, the microprocessor is required to treat all instruction level caching equally, without discriminating or differentiating processing of different types of applications.

One or more embodiments can also be fabricated as computer readable code on a non-transitory computer readable storage medium. The non-transitory computer readable storage medium is any non-transitory data storage device that can store data, which can be read later by a computer system. Examples of the non-transitory computer readable storage medium include hard drives, network attached storage (NAS), read-only memory, random-access memory, CD-ROMs, CD-Rs, CD-RWs, magnetic tapes, and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments.

What is claimed is:

1. A method comprising:
identifying, by a processor, a plurality of deduplication domains for a storage system;
creating, by the processor, a fingerprint index for each deduplication domain, wherein each data block stored in the storage system is associated with one of the plurality of deduplication domains;
receiving, by the processor, a first data block at the storage system;
identifying, by the processor, a first deduplication domain from the plurality of deduplication domains corresponding to the first data block;
deduplicating, by the processor, the first data block within the first deduplication domain based on a first fingerprint index associated with the first deduplication domain;
determining, by the processor, whether a size of a global fingerprint buffer exceeds a predetermined threshold, the global fingerprint buffer including space for storing fingerprint buffers of the deduplication domains; and
based on a determination that the size of the global fingerprint buffer exceeds the predetermined threshold, selecting, by the processor, a deduplication domain of the plurality of deduplication domains and updating the fingerprint index of the selected deduplication domain with fingerprint mappings stored in the fingerprint buffer of the selected deduplication domain.

2. The method as recited in claim 1, wherein deduplicating the first data block includes:
determining a first fingerprint for the first data block;
determining whether the first fingerprint is in the first fingerprint index; and
storing the first data block in permanent storage based on a determination that the first fingerprint is not in the first fingerprint index.

3. The method as recited in claim 2, wherein deduplicating the first data block further includes:
based on a determination that the first fingerprint is not in the first fingerprint index, adding a fingerprint mapping to a first fingerprint buffer of the first deduplication domain kept in a random access memory (RAM), the fingerprint mapping including the first fingerprint and a location of the first data block in the permanent storage.

4. The method as recited in claim 3,
wherein selecting the deduplication domain for updating the fingerprint index further comprises selecting the deduplication domain with a highest ratio of a size of the fingerprint buffer in the global fingerprint buffer to a size of the fingerprint index.

5. The method as recited in claim 4, wherein updating the fingerprint index further includes:
merging fingerprint mappings in RAM associated with the selected deduplication domain with the fingerprint index to create a new fingerprint index; and
freeing from RAM the fingerprint mappings in RAM associated with the selected deduplication domain.

6. The method as recited in claim 1, wherein deduplicating the first data block further includes:
determining a first fingerprint for the first data block;
based on a determination that the first fingerprint is in the first fingerprint index, identifying a second data block associated with the first fingerprint in the first fingerprint index; and associating the first data block with the first fingerprint and the second data block, wherein the first data block is not added to the permanent storage.

7. The method as recited in claim 1, wherein each deduplication domain is defined to track duplicate data blocks within the deduplication domain to store one copy of the duplicate data blocks, wherein data blocks existing in more than one deduplication domain will have a separate copy stored in permanent storage for each of the deduplication domains where the data blocks exist.

8. The method as recited in claim 1, wherein identifying a first deduplication domain includes:
determining a first volume of the storage system that includes the first data block; and
determining the first deduplication domain as the deduplication domain associated with the first volume.

9. The method as recited in claim 1, wherein identifying a plurality of deduplication domains for a storage system includes:
providing a user interface for receiving input from an administrator of the storage system, the input identifying one of the deduplication domains for each volume in the storage system.

10. The method as recited in claim 1, wherein the data blocks for the plurality of deduplication domains are stored intermingled within a permanent storage of the storage system.

11. A storage system comprising:
a permanent storage for storing data blocks, wherein each data block stored in the permanent storage is associated with one of a plurality of deduplication domains;
a memory for storing a fingerprint index for each deduplication domain;
a processor to receive a first data block and identify a first deduplication domain from the plurality of deduplication domains corresponding to the first data block, wherein the processor is to deduplicate the first data block within the first deduplication domain based on a first fingerprint index associated with the first deduplication domain;
a random access memory (RAM) for storing a global fingerprint buffer including a first fingerprint buffer on which is stored first fingerprint mappings, wherein the processor is further to:
determine whether a size of the global fingerprint buffer exceeds a predetermined threshold; and
based on a determination that the size of the global fingerprint buffer exceeds the predetermined threshold, select, by the processor, a deduplication domain of the plurality of deduplication domains and update the fingerprint index of the selected deduplication domain with fingerprint mappings stored in the fingerprint buffer of the selected deduplication domain.

12. The storage system as recited in claim 11, wherein the processor is to deduplicate the first data block by determining a first fingerprint for the first data block, determining whether the first fingerprint is in the first fingerprint index, and storing the first data block in the permanent storage based on the first fingerprint not being in the first fingerprint index.

13. The storage system as recited in claim 12, wherein based on the first fingerprint not being in the first fingerprint index, the processor is to add a fingerprint mapping to the global fingerprint buffer, the fingerprint mapping including the first fingerprint and a location of the first data block in the permanent storage.

14. The storage system as recited in claim 12, wherein based on the first fingerprint not being in the first fingerprint index, the processor is to add a fingerprint mapping to a buffer kept in the memory, the fingerprint mapping including the first fingerprint and a location of the first data block in the permanent storage.

15. The storage system as recited in claim 11, wherein the fingerprint index includes fingerprints of data blocks stored in the storage system, each fingerprint being mapped to one of the data blocks stored in the storage system.

16. A non-transitory computer-readable storage medium storing a computer program that when executed by a processor, cause the processor to:
determine whether a size of a global fingerprint buffer exceeds a predetermined threshold, the global fingerprint buffer including a first fingerprint buffer storing first fingerprint mappings for a first fingerprint index and a second fingerprint buffer storing second fingerprint mappings for a second fingerprint index, the first fingerprint index being associated with a first deduplication domain and the second fingerprint index being associated with a second deduplication domain for a storage system; and
based on a determination that the global fingerprint buffer exceeds a predetermined threshold,
select one of the first fingerprint buffer and the second fingerprint buffer for merging with a respective one of the first fingerprint index and the second fingerprint index; and
based on the selection, merge the first fingerprint mappings of the first fingerprint buffer with the first fingerprint index or merge the second fingerprint mappings of the second fingerprint buffer with the second fingerprint index.

17. The storage medium as recited in claim 16, wherein the first deduplication domain and the second deduplication domain are parts of a plurality of deduplication domains for the storage system on which is stored data blocks, and wherein the data blocks for the plurality of deduplication domains are stored intermingled within a permanent storage of the storage system.

18. The storage medium as recited in claim 16, wherein the computer program is further to cause the processor to:
provide a user interface for receiving input from an administrator of the storage system to identify a plurality of deduplication domains for the storage system.

19. The storage medium as recited in claim 16, wherein to deduplicate a first data block, the computer program is further to cause the processor to:
determine a first fingerprint for the first data block;
determine whether the first fingerprint is in the first fingerprint index; and
store the first data block in a permanent storage based on the first fingerprint not being in the first fingerprint index.

20. The storage medium as recited in claim 16, wherein to deduplicate a first data block, the computer program is further to cause the processor to:
determine a first fingerprint for the first data block;
based on the first fingerprint being in the first fingerprint index, identify a second data block associated with the first fingerprint in the first fingerprint index;
associate the first data block with the first fingerprint and the second data block, wherein the first data block is not added to the permanent storage; and
based on the first fingerprint not being in the first fingerprint index, add a fingerprint mapping to a buffer kept in a random access memory (RAM) to deduplicate the first data block, the fingerprint mapping including the first fingerprint and a location of the first data block in the permanent storage.

* * * * *